July 14, 1931.  C. A. DEAN  1,814,296
ROTARY DRILL BIT
Filed Oct. 18, 1927

Inventor
Charles A. Dean,
By Prentiss, Stone & Boyden
Attorneys

Patented July 14, 1931

1,814,296

UNITED STATES PATENT OFFICE

CHARLES A. DEAN, OF COALINGA, CALIFORNIA

ROTARY DRILL BIT

Application filed October 18, 1927. Serial No. 227,037.

This invention relates to drilling, boring or cutting and to new and appropriate means therefor.

I shall illustrate the invention with reference, by way of example, to earth boring, or more particularly to well drilling. It will be understood that with my new apparatus a bore may be made horizontally, or vertically, or at some angle, and that this may be through different types of formation. Indeed for oil or water drilling where a variety of formations is encountered in one drill hole, the advantages of my invention will be especially apparent.

I have devised a rotary drill, using cutters that often are known as the roller type. But by my invention the cutters are given a mechanical drive from the drill stem by the mechanism to be described. A plurality of cutters preferably is employed, each drilling according to the particular conditions confronting it, yet the whole group will at the same time act as a unitary drill head. Among other advantages will be those of a comparatively low power consumption, maintenance of the bore or diameter of the drill hole, and prolonged life of the drilling elements.

For illustrating the broad form of my invention two specific embodiments of my rotary drill are shown in the drawings, in which.

Figure 3:
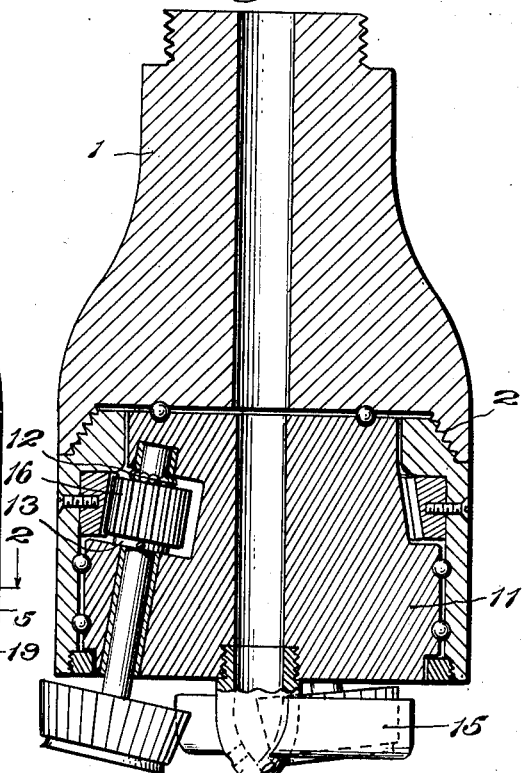
Figure 4:
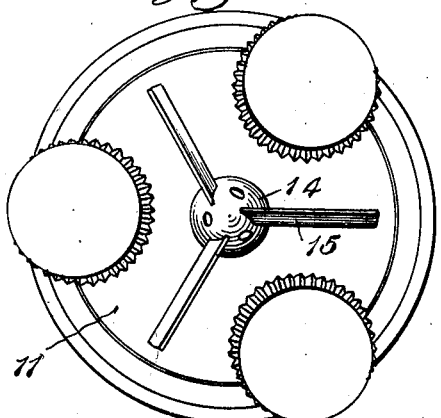

Fig. 3 similarly is a vertical section of a modified form of my rotary drill; and Fig. 4 is a bottom view looking up at the lower part of the form illustrated in Fig. 3.

Figure 1:
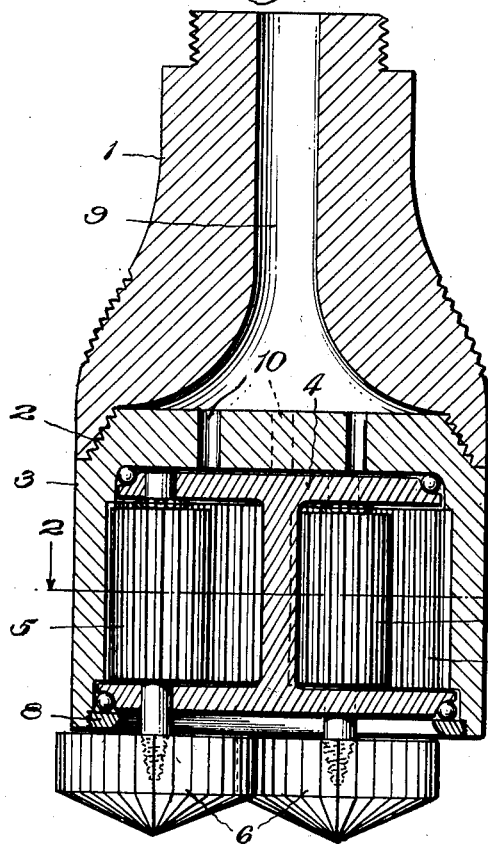
Fig. 1 is a vertical section of the one form.

Referring to Fig. 1, it will be seen that attached to the end of the drill rod or pipe 1, as for example by threaded connection 2, there is a shell 3. The particular form of the drill stem, the diameter of this shell, its particular mode of attachment, its contour and the material of its construction will be matters of selection, but I prefer the threaded connection and curved contour shown. The inner cylindrical surface of the shell, in the form of Fig. 1, is cut or otherwise constructed to constitute a gear member 19, preferably nearly the entire length of the inner cylindrical surface, as shown.

The top of this cylindrical shell 3 may be open to any extent consistent with proper strength or it may even be solid, except that such fluid passages as are desired may be constructed therethrough as I have illustrated in the latter form.

Above the upper end of the gear teeth the shell will be extended to receive the upper branches of a spider or gear carrier 4, free to turn in the space shown within the shell. The upper surface of the spider will be equipped with low friction means, for example by roller bearings placed preferably at the periphery. In the case where the shell has no top the bearings may be arranged to bear directly against the bottom of the member 1, this latter, of course, being modified in shape for that purpose. From these upper arms the spider will form a central column or other support, and at the bottom it will comprise similar arms fitting into an enlargement constructed at the lower end of the gear teeth of the shell. Preferably I have illustrated these upper and lower arms as having openings in vertical register with each other so as to receive the shafts of vertical pinion gears 5 inserted therein.

The gearing and mounting, of course, could readily be adapted to an angular or slanting mount, if desired. The lower ends of these shafts project below the shell and are threaded, keyed or otherwise designed to retain securely the roller or cutter members proper, shown at 6. These pinion gears I have illustrated as extending nearly the whole distance between the carrier arms, but, of course, this might be varied. Between the upper carrier arms and their respective pinions I prefer to place low friction means; for example, ball bearings. These pinion gears of course intermesh with the gear teeth formed inside the shell. At the lower periphery of the gear carrier I place low friction means; for example, ball bearings. Against these and to retain the gear carrier in place I screw a lock washer 8 into the lower inner end of the shell, though other retaining means could be employed.

The number and sort of pinions with their respective cutters will be designed as desired, but I show three similar ones spaced equidistant within the shell. The gearing ratio or the relative pinion diameter likewise are matters of choice. There could be gear teeth of different ratio at different heights with corresponding differences of pinion gear teeth, if desired. The design of the cutters proper will be according to the problem at hand, or different design or size of cutters may be employed as desired, either in sequence or simultaneously. In Fig. 1 I have shown conical-cylindrical cutters with milled bottoms, of diameter and position such as to ream or maintain the desired bore. But I desire to point out that the success of my device is not dependent on extending these cutters to beyond the diameter of the drill bit shell, nor to the walls of the bore hole. This mechanical drive of my cutters will be clear in referring below to the description of the operation of this rotary bit.

In any form of my invention it is of advantage to construct teeth (for example, milled) at the upper exterior portion of the bit body, to overcome "hanging" on obstructions in extracting the bit.

I may add that the usual fluid passage 9 may be continued through the shell top and pinions by openings 10 positioned therein as desired, and extend through or between the pinions or through a passage in the carrier stem. This will permit the usual flushing of the cutters and débris. Or, as stated earlier, the shell top may be practically open.

Fig. 3 illustrates another embodiment of my invention operating on the same general principle. Here the inner surface of the shell is shown not cut its whole length to form gear members, but only its upper portion and the gear teeth are shown riveted or screwed to the shell. The gear carrier 11 fits into the shell preferably as a solid unit, except that recesses are formed near the upper part to receive the pinion gears 16, and openings extend down through the carrier from these recesses to journal the respective cutter shafts. These recesses may be be inset individually for the respective pinions, or could be in the form of an annular cut if desired. I have illustrated one pinion recess. The pinion shafts I have shown extending through a bushing, but it will be clear that I may make use of roller or other low-friction means. Preferably there will be a thrust bearing 12 above the pinions and a shaft nut 13 below them, as shown. The cutters proper that may be selected are to be fitted to their shafts in desired manner. The upper periphery of the gear carrier will be of decreased diameter so far as necessary to avoid the gear members on the shell. There are preferably low friction means to form thrust bearings at the upper surface of the gear carrier, and also low friction means disposed along the sides of the pinion carrier inserted, if desired, through plugs in the shell. A lock ring, or other desired means, will serve to retain the carrier within the shell. The pinions and cutter shafts may be vertical or at an angle; I have illustrated the latter. It has the advantage of affording a larger pinion drive for a given cutter. In this latter case the gear teeth inside the shell will be formed with the proper angle to enmesh the pinion gear teeth, or vice versa. Here also the cutter members proper may be of the desired design.

If desired, one may equip the drill with the usual core head and barrel going up the central water course, both through the gear carrier. Thus it is quite possible to take a core and cut the hole to the size desired at the same time. I illustrate a plug 14 screwed into the fluid outlet at the bottom of the gear carrier. This is equipped with fluid openings and diverting wings 15, as shown. Or a cutter could be inserted instead, with or without provision for fluid outlet. It will be appreciated that whatever particular device is fastened at the place of the member 14 will be rotated as a unit with the carrier 11. A central cutter member would serve as an inside and bottom cutter, while the others would size and ream the hole as desired. These outer cutters may or may not present their outer surface parallel with the bore hole, according to the needs of a given case. By "cutter", of course I mean also to include such forms as may, if desired, effect a milling and/or reaming action.

From this description it is clear that others may adapt the principle of my rotary drill bit to particular needs. Various modifications and changes may occur, yet be within the scope of my invention.

Figure 2:
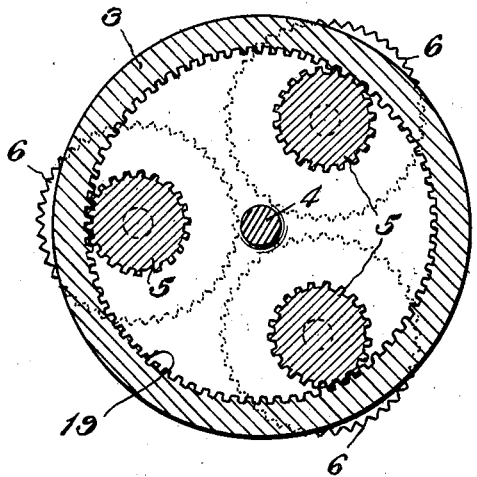
Fig. 2 is the corresponding horizontal section along line 2—2 of Fig. 1.

For illustration of the operation of these, Figs. 1 and 2 may be consulted.

Supposing that the bit were buried in débris so that each of the individual cutters were choked to prevent its turning on its separate axis. The drill stem and collar or shell continue to rotate, however, and because of the force applied through the collar gearing to the pinion gearing and carrier, the pinions and their cutters all are dragged around as a unit with the gear carrier. But the leverage of this force applied, as I apply it, to the outer teeth of the pinions is considerable and there will come a time when the pinions will be able to turn on their own axes, more or less freely, according to the immediate conditions. Each then will do so by virtue of the direct drive on its individual pinion from the inner geared surface of the shell. I wish to emphasize that each individual pinion and cutter thus will be driven separately on its own axis and according to the resultant forces acting on it, in synchronism with the others. There is thus a positive rotation of each cutter, yet from the same collar. Further, to the extent that any one or more of the individual cutters is prevented by débris or by internal friction from turning on its own axis with ideal freedom, to that extent there will be a tendency for the drill head to rotate as a whole. Thus when there is hard drilling at any place the whole bit will tend to be dragged through. In practice generally there will be a combination of these movements of the drill head as a whole and of the separate cutters on their own axes at their own rate and the resultant of the design and of the conditions of boring will determine the actual movements at any given time. It should be noted that this positive drive will occur regardless of the diameter of the bore hole and of whether the cutters are extended to act as reamers or even whether they are operating well away from the walls of the hole, the drive is positive and direct from the gear casing to the outside of the pinions. It is possible to insert idler gears between the collar and cutter pinions, but I do not prefer that form, since those illustrated are more positive and simple, and introduce less friction and less likelihood of breakage.

I have endeavored to describe my invention clearly and fully in accordance with the patent statutes so that anyone skilled in these matters may follow the practice of my invention. But it will be clear that its scope is not to be limited. I mean to be limited only so far as the prior art may require.

I claim:—

1. A rotary drill comprising a collar rigidly connected to a drill rod and geared internally, a carrier rotatably mounted within said collar, said carrier being mounted loosely with respect to said rod and bearing rotatable cutter shafts having geared connection with said inner collar surface.

2. A rotary drill comprising a collar rigidly connected to a drill stem, a rotatable carrier secured within said collar for rotation relatively to said drill stem and bearing cutter shafts operatively connected by pinion gears with a geared inner portion of said collar.

3. In a rotary drill comprising a shell containing a rotatable cutter carrier supported by bearings, a rotatable cutter shaft geared directly to the inner surface of said shell.

4. A rotary drill comprising a drill stem, a rotatable shell whose inner surface is geared having driving connection with said stem, a rotatable member carrying a plurality of spaced, rotatable cutters geared through pinions to said inner surface, and a central head rigidly secured to said rotatable carrier.

5. A rotary drill bit connected to a drill rod through a shell, a freely rotatable gear carrier held within said shell, a plurality of shafts freely and rotatably mounted within said carrier on inclined axes, carrying rotary cutters and engaging by gear drive with the shell.

In testimony whereof I affix my signature.

CHARLES A. DEAN.